United States Patent

Schmutz et al.

[11] 3,891,647
[45] June 24, 1975

[54] 2-TRIFLUOROMETHYL-SULPHONYL-11-SUBSTITUTED-PIPERAZINYL-DIBENZ [B,F][1,4] OXAZEPINE

[75] Inventors: Jean Schmutz, Muri; Fritz Hunziker; Franz Martin Künzle, both of Bern, all of Switzerland

[73] Assignee: Wander Ltd., Bern, Switzerland

[22] Filed: Jan. 23, 1973

[21] Appl. No.: 326,121

Related U.S. Application Data

[63] Continuation-in-part of Ser. No. 166,997, July 28, 1971, abandoned.

[30] Foreign Application Priority Data

| | | |
|---|---|---|
| Aug. 6, 1970 | Switzerland | 11922/70 |
| June 1, 1971 | Switzerland | 07915/71 |
| June 6, 1972 | Switzerland | 08441/72 |
| Oct. 20, 1972 | Switzerland | 15415/72 |
| Oct. 20, 1972 | Switzerland | 15416/72 |

[52] U.S. Cl. ...... 260/268 TR; 260/268 C; 260/333; 260/521 A; 260/580; 260/609 R; 424/250
[51] Int. Cl. .................................... C07d 51/70
[58] Field of Search ...................... 260/268 TR

[56] References Cited
UNITED STATES PATENTS

| | | | |
|---|---|---|---|
| 2,889,322 | 6/1959 | Jacob | 260/268 TR |
| 2,919,272 | 12/1959 | Craig | 260/268 TR |
| 3,546,226 | 12/1970 | Schmutz et al. | 260/268 TR |
| 3,717,637 | 2/1973 | Hunziker et al. | 260/268 TR |

Primary Examiner—Donald G. Daus
Assistant Examiner—Jose Tovar
Attorney, Agent, or Firm—Gerald D. Sharkin; Robert S. Honor; Thomas O. McGovern

[57] ABSTRACT

The invention concerns new compounds of the formula:

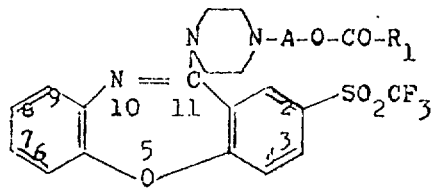

wherein
A is alkylene of 1 to 3 carbon atoms, and
$R_1$ is alkyl or alkenyl, of
3 to 18 carbon atoms,
and acid addition salts thereof.

The compounds are neuroleptic and antiemetic agents.

14 Claims, No Drawings

2-TRIFLUOROMETHYL-SULPHONYL-11-SUBSTITUTED-PIPERAZINYL-DIBENZ [B,F][1,4] OXAZEPINE

This is a continuation-in-part application of our copending application, Ser. No. 166,997, filed July 28, 1971 now abandoned.

This invention relates to dibenz[b,f][1,4]oxazepine derivatives.

More particularly, this invention provides compounds of formula I,

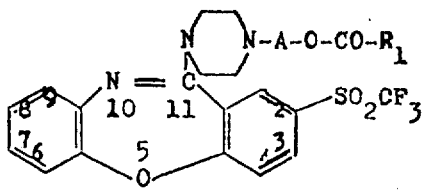

wherein
A is alkylene of 1 to 3 carbon atoms, and
R₁ is a saturated hydrocarbon radical of 3 to 18 carbon atoms, or an unsaturated hydrocarbon radical of 3 to 18 carbon atoms, preferably having one double bond near the middle of the radical.

The invention also provides processes for the production of the compounds of formula I, characterized by
a. reacting a compound of formula VIII,

R₁ — COOH         VIII wherein R₁ is as defined above, or a salt or reactive derivative thereof, with a compound of formula III,

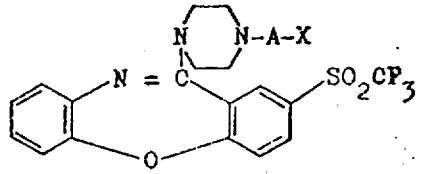

wherein
A is as defined above, and
X signifies a hydroxyl group, a group of formula –OMe, wherein Me signifies a metal, or a reactive radical capable of being split off during the reaction, or
b. reacting a compound of formula V,

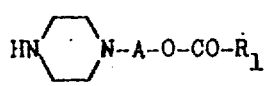

wherein A and R₁ are as defined above, with a compound of formula IV,

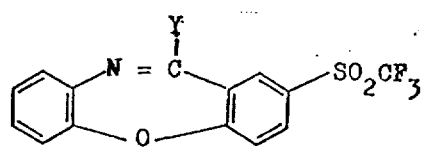

wherein Y is a reactive radical capable of being split off with the hydrogen atom on the nitrogen atom of the piperazine of formula V, or
c. reacting the compound of formula VI

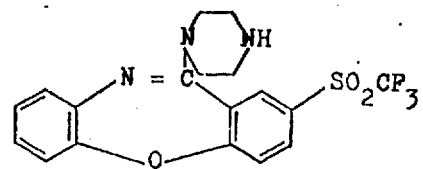

with a compound of formula VII,

Z—A—O—CO—R₁         VII wherein
A and R₁ are as defined above, and
Z is a reactive radical capable of being split off with the hydrogen atom on the nitrogen atom in the piperazino substituent of the compound of formula VI.

The radicals A and R₁ may be straight-chain or branched-chain radicals.

Process (a) is conveniently carried out in an inert organic solvent, e.g., benzene, toluene or pyridine, and at a temperature of from about room temperature to about 50°C. The reaction time may, for example, vary from 1 to 24 hours. Suitable reactive derivatives of the compounds of formula VIII include acid halides, preferably the acid chloride, and the acid anhydride. Suitable salts of the compound of formula VIII include the silver salt. Where X in the compound of formula III signifies the group —OMe, Me preferably signifies an alkali metal. where X signifies a reactive radical capable of being split off during the reaction, suitable such radicals include halogen atoms, preferably a chlorine atom, and the tosyl radical. As will be appreciated by those skilled in the art, where X, in the compound of formula III, signifies a hydroxy group, the free acid of formula VIII or a reactive derivative thereof may be employed; where X signifies the group –OMe, a reactive derivative of a compound of formula VIII may be employed, and where X signifies a reactive group capable of being split off during the reaction, a salt of the compound of formula VIII may be employed. when a compound of formula III is employed, and, particularly, when an acid halide or anhydride of a compound of formula VIII is employed, the process may suitably be carried out in the presence of an acid-binding agent, e.g., triethylamine or pyridine.

Process (b) is suitably effected in an inert organic solvent, e.g., xylene, and at a temperature of from 50°C to the reflux temperature of the reaction medium, preferably at the reflux temperature of the reaction medium. The reaction time may, for example, be about 5 hours. In the compound of formula IV, Y suitably signifies a halogen atom, an alkoxy, e.g., methoxy, group, an alkylthio, e.g. methylmercapto, group, the sulphhydryl group, an aralkylthio group, or a substituted aralkylthio group, e.g., the p-nitrobenzylthio group, or a tosyl group.

Process (c) is conveniently effected at a temperature of from 50°C to the reflux temperature of the reaction mixture, and in the presence of an inert organic solvent, e.g., dioxane, toluene or an alcohol, e.g. ethanol. The process is suitably carried out in the presence of an acid-binding agent, e.g., potassium carbonate. In the compound of formula VII, Z suitably signifies a halogen atom, preferably a chlorine atom, or a tosyl radical.

The resulting compounds of formula I may be isolated and purified using conventional techniques. Where required, free base forms of the compounds may be converted into acid addition salt forms in conventional manner, and vice versa.

The compounds of formula III, wherein X signifies a hydroxyl group, used as starting materials in process (a), may, for example, be obtained by reacting the imide chloride of formula IX

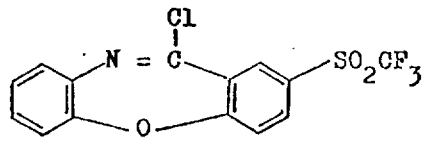

IX with a piperazine derivative of formula X,

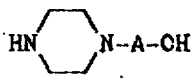

X wherein A is as defined above.

The process may be carried out in conventional manner.

The remaining compounds of formula III may be produced in conventional manner from the compounds of formula III, wherein X signifies a hydroxyl group. Thus, for example, the compounds of of formula III, wherein X signifies a halogen atom, may, for example, be obtained by halogenating the corresponding hydroxy compound of formula III. Furthermore, the compounds of formula III, wherein X signifies a tosyl radical, may, for example, be obtained by treating the corresponding hydroxy compound of formula III with toluenesulphonic acid.

The imide chloride of formula IX may be obtained by halogenating the lactam of formula XI

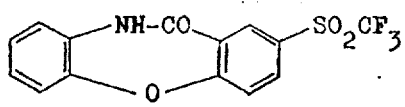

XI in conventional manner, for example employing phosphorus oxychloride. The lactam XI may, for example, be produced as follows:

2-Nitro-4'-methylthio-diphenyl oxide of formula XII

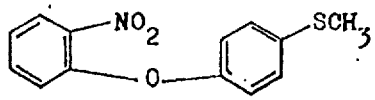

XII is reacted with chlorine to obtain the compound of formula XIII,

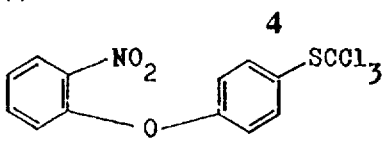

XIII and this is treated with antimony trifluoride. The resulting compound of formula XIV

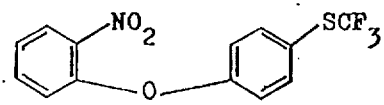

XIV is reduced to the amine and this is converted with phosgene into the isocyanate of formula XV.

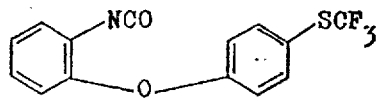

XV

Ring closure of the isocyanate of formula XV with phosphorus oxychloride and phosphorus pentoxide yields the lactam of formula XVI,

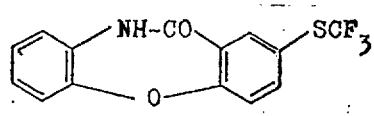

XVI and this is oxidized with hydrogen peroxide to obtain the lactam of formula XI.

The above described reactions for producing the compound of formula XI may all be effected in conventional manner, for example as illustrated in the Examples hereinafter.

The compounds of formula IV, used as starting materials in process (b), may be produced in conventional manner. Thus, for example, that in which X signifies a sulphhydryl group may be produced conventionally from the lactam of formula XI, and those in which Y signifies an alkylthio or aralkylthio group may be produced from the sulphhydryl compound by alkylation or aralkylation. Those in which Y signifies a halogen atom, e.g., a chlorine atom, may be obtained in conventional manner by treating the lactam of formula XI with a halogenating agent, e.g., phosphorus oxychloride or pentachloride, suitably in the presence of a catalytic amount of dimethyl aniline or dimethyl formamide.

The compounds of formula V, used as starting materials in process (b), may, for example, be obtained by reacting a piperazine derivative of formula XVII,

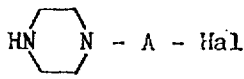

XVII wherein
A is as defined above, and
Hal signifies a halogen atom,
with a silver salt of a compound of formula VIII, in conventional manner.

The halogen compound of formula XVII may, for example, be obtained by halogenating the corresponding alcohols, which are either known or may be produced in conventional manner.

The compounds of formula V may also be obtained by reacting a compound of formula XVIII,

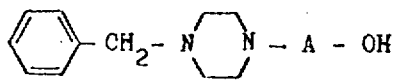

XVIII wherein A is as defined above, with a compound of formula VIII, stated above, or a reactive derivative thereof, and, subsequently, hydrogenolytically removing the benzyl group from the reaction product.

The compounds of formula XVIII are known or may be produced in conventional manner.

The 2-trifluoromethylsulphonyl-11-(1-piperazinyl)dibenz-[b,f][1,4]oxazepine, used as starting material in process c), may, for example, be obtained by reacting a compound of formula IV with piperazine, in conventional manner.

The compounds of formula VII, used as starting materials in process c), may, for example, be obtained by reacting a compound of formula XIX, $$Z - A - OH$$

XIX wherein A and Z are as defined above, with a compound of formula VIII, stated above, or a reactive acid derivative thereof.

The compounds of formula XIX are known or may be produced in conventional manner.

In so far as the production of the starting materials is not particularly described these compounds are known or may be produced and purified in accordance with known processes or in a manner analogous to the processes described herein or to known processes.

The compounds of formula I possess pharmacological activity. In particular, they possess central nervous system activity, neuroleptic and antiemetic activity, as indicated, e.g., by an apomorphineantagonistic effect in rats given 1.25 to 20 mg per kg of body weight of compound [method of Janssen et al., Arzneimittelforschung 10, 1003 (1960)]. The compounds furthermore exhibit a depot effect, as indicated by the fact that the apomorphine-antagonistic effect is sustained over a period of 1 to 3 weeks. The method employed to determine the depot effect is as follows: 1.25 to 20 mg per kg of animal body weight of compound, in 1 to 3% solution in Miglyol$^{(R)}$, is administered, intramuscularly, to 80 rats. After 1, 2, 4, 7, 10, 14, 18 and 21 days, to separate groups of 10 rats is administered, i.v., 2 mg per kg of body weight of apomorphine and the rats are tested according to the method of Janssen et al., above. The compounds are therefore indicated for use as neuroleptic and antiemetic agents.

The neuroleptic and antiemetic effective dosages will vary depending on the particular compound employed, mode of administration and therapy desired, but, in general, satisfactory results are obtained for both effects when the compounds are administered parenterally, particularly intramuscularly, every one to three weeks at a dosage of from about 0.2 mg to 20 mg per kg of animal body weight. For most larger mammals, an indicated suitable daily dosage is from 10 to 40 mg, administered in a single dose every one to three weeks.

The compounds are administered parenterally in such forms as injectable solutions or suspensions. For parenteral administration, suitable preparations may comprise a solution of a compound of formula I in an oil, for example a 1 to 3% solution in a vegetable oil, such as sesame oil, peanut oil and olive oil, or, preferably, in a glyceride of a saturated fatty acid having a mean chain length ($C_8$–$C_{12}$) of the Miglyol$^{(R)}$ type. The oily solutions, which are indicated for intramuscular administration, may be sterilized by germ filtration and subsequent heating to 120°C for 20 minutes.

The compounds of formula I may be used in free base form or in the form of pharmaceutically acceptable acid addition salts, which salt forms have the same order of activity as the free base forms. Suitable acids for salt formation include organic acids, such as toluenesulphonic, malonic, succinic, malic, maleic and tartaric acid, and inorganic acids, such as a hydrohalic acid, sulphuric, nitric and phosphoric acid.

In one preferred class of compounds of formula I, A is a straight-chain alkylene group, especially ethylene.

In a further preferred class of compounds of formula I, $R_1$ is a straight-chain saturated hydrocarbon radical, especially of from 3 to 13 carbon atoms.

The preferred compounds of formula I are 2-trifluoromethylsulphonyl-11-(4β-tetradecanolyoxyethyl-1-piperazinyl)dibenz[b,f][1,4]-oxazepine and 2-trifluoromethylsulphonyl-11-(4β-decanoyloxyethyl-1-piperazinyl)dibenz[b,f][1,4]oxazepine.

In another further preferred class of compounds of formula I, $R_1$ is a branched-chain hydrocarbon radical. A preferred radical is one comprising a straight-chain hydrocarbon radical substituted with methyl, preferably mono- or di-substituted with methyl. The methyl radicals are preferably attached to the penultimate terminal carbon atom, thereby to form a terminal isopropyl or tert.butyl moiety.

In another preferred class of compounds of formula I, $R_1$ is alkenyl, $R_1$ may be, for example, the hydrocarbon moiety of an olefinic fatty acid, e.g., oleic acid, or branched as mentioned in the preceding paragraph. The unsaturated bonds are preferably located near the middle of the alkyl chain length. The following Examples illustrate the invention.

EXAMPLE 1

2-Trifluoromethylsulphonyl-11-(4β-heptanoyloxyethyl-1-piperazinyl)dibenz[b,f][1,4]oxazepine [process(a)]

1 g of 2-trifluoromethylsulphonyl-11-(4β-hydroxyethyl-1-piperazinyl)dibenz[b,f][1,4]oxazepine is dissolved in 20 cc of absolute pyridine, 1.1 g of enanthic acid chloride are added to the solution and this is allowed to stand over night. The reaction mixture is strongly concentrated by evaporation in a vacuum and water is added to the residue. The reaction mixture is rendered alkaline with caustic soda solution and is subsequently extracted with ether. The ether phase is repeatedly washed with water, dried over sodium sulphate, clarified with active charcoal and concentrated by evaporation. 2-Trifluoromethylsulphonyl-11-(4β-heptanoyloxyethyl-1piperazinyl)dibenz[b,f][1,4]oxazepine is obtained as residue in the form of a yellowish oil which cannot be crystallized.

Oxalate salt form 607 mg of the oily free base form of the title compound and 135 mg of oxalic acid are mixed and dissolved in acetone. After addition of diethyl ether, crystals of the oxalate salt form of the title compound separate out, M.P. 197°–199°C. Thin layer chromatogram: see Table.

The 2-trifluoromethylsulphonyl-11-(4β-hydroxyethyl-1-piperazinyl)dibenz[b,f][1,4]oxazepine, used as starting material in this process, may be obtained as described below:

52.2 g of 2-nitro-4'-methylthio-diphenyl oxide (M.P. 59°–61°C) are dissolved in 1.5 liters of chloroform and chlorination is effected at 20°C while exposing to light and passing a total of 43 g of chlorine gas into the solution. The residue obtained after concentrating the reaction mixture by evaporation in a vacuum is crystallized from ether/petroleum ether, whereby 2-nitro-4'-trichloromethylthio-diphenyl oxide, having a M.P. of 76°–79°C, is obtained.

61.3 g of this product are dissolved in 280 cc of Sulfolane and heated to 150°C within 30 minutes with 41 g of antimony trifluoride. The reaction mixture is kept at this temperature for 1½ hours, a large amount of dilute hydrochloric acid is added and extraction is effected with ether. The organic phase is washed with dilute hydrochloric acid and dilute caustic soda solution, is dried over sodium sulphate and evaporated to dryness in a vacuum. 2-Nitro-4'-trifluoromethylthio-diphenyl oxide, having a B.P. of 125°–130°C/0.1 mm of Hg, is obtained as residue and may be crystallized from ether/petroleum ether to obtain yellowish crystals having a M.P. of 40°–42°C.

27.8 g of this compound are hydrogenated in glacial acetic acid with Raney nickel at normal pressure and 20°C. 2-Amino-4'-trifluoromethylthio-diphenyl oxide is obtained as colourless oil having a B.P. of 110°–114°C/0.05 mm of Hg.

26 g of 2-amino-4'-trifluoromethylthio-diphenyl oxide are added dropwise while stirring to 150 cc of an approximately 20% solution of phosgene in absolute toluene. The reaction mixture is subsequently heated to the boil under reflux for 15 minutes while passing phosgene into the solution. After removing the toluene by distillation, the residue is fractionated in a vacuum. 2-Isocyanato-4'-trifluoromethylthio-diphenyl oxide is obtained as colourless oil having a B.P. of 110°–115°C/0.07 mm of Hg.

3 g of this product are heated to the boil under reflux for 24 hours with 40 cc of phosphorus oxychloride and 4 g of phosphorus pentoxide. The reaction mixture is concentrated by evaporation in a vacuum, ice is added to the resulting viscous residue while cooling, the mixture is rendered almost neutral with concentrated caustic soda solution, is allowed to stand for 24 hours and is extracted with ether. The ether phase is washed with water and aqueous sodium chloride solution, is dried over sodium sulphate and strongly concentrated by evaporation. After the addition of petroleum ether, 2-trifluoromethylthio-10,11-dihydro-11-oxodibenz[b,f][1,4]oxazepine is obtained in the form of crystals having a M.P. of 215°–216°C.

2.5 g of this compound are suspended in 50 cc of glacial acetic acid and 4 cc of a 30% hydrogen peroxide solution are added. The reaction mixture is heated to 70°C for 1 hour and subsequently to 100°–110°C for 1½ hours. Water is added to the reaction mixture, this is concentrated in a vacuum and the resulting mash is filtered with suction and taken up in ether. The ether phase is washed with water, dilute caustic soda solution and aqueous sodium chloride solution, is dried over sodium sulphate, treated with active charcoal and filtered through a small amount of aluminium oxide. The filtrate is concentrated and petroleum ether is added. The precipitated crystals are separated and recrystallized from acetone/petroleum ether. 2-Trifluoromethylsulphonyl-10,11-dihydro-11-oxo-dibenz[b,f][1,4]oxazepine, having a M.P. of 193°–198°C, is obtained.

4.5 g of this product are heated to the boil under reflux for 4½ hours with 100 cc of phosphorus oxychloride and 2 cc of N,N-dimethyl aniline. After removing the excess phosphorus oxychloride by distillation in a vacuum, the residue is dissolved in 120 cc of xylene and poured on ice/water. The xylene phase is washed with dilute hydrochloric acid and with water, is dried over sodium sulphate and concentrated to 100 cc in a vacuum. The solution, containing 2-trifluoromethylsulphonyl-11-chloro-dibenz[b,f][1,4]-oxazepine, is heated to the boil under reflux for 5 hours with 12 g of N-(β-hydroxyethyl)piperazine. The reaction mixture is washed with dilute caustic soda solution and with water and is then exhaustively extracted with dilute hydrochloric acid. The acid extracts are rendered alkaline with concentrated caustic soda solution and the precipitated base is extracted with ether. The ether phase is washed with water, dried over sodium sulphate, filtered and concentrated by evaporation. The residue is crystallized from ether/petroleum ether, whereby 2-trifluoromethylsulphonyl-11-(4β-hydroxyethyl-1-piperazinyl)dibenz[b,f][1,4]oxazepine is obtained in the form of prisms having a M.P. of 121°–123°C.

EXAMPLE 2

2-Trifluoromethylsulphonyl-11-(4β-tetradecanoyloxyethyl-1-piperazinyl)dibenz[b,f][1,4]oxazepine [process (a)]

2-Trifluoromethylsulphonyl-11-(4β-tetradecanoyloxyethyl-1-piperazinyl)-dibenz[b,f][1,4]oxazepine is obtained in the form of a yellowish oil, which cannot be crystallized, by the process described in Example 1, except that 0.5 g of 2-trifluoromethylsulphonyl-11-(4β-hydroxyethyl-1-piperazinyl)dibenz[b,f][1,4]oxazepine, 10 cc of absolute pyridine and 0.5 cc of myristic acid chloride are used as starting materials. This layer chromatogram: see Table.

EXAMPLE 3

2-Trifluoromethylsulphonyl-11-(4β-butanoyloxyethyl-1-piperazinyl)dibenz[b,f][1,4]oxazepine [process (a)]

2-Trifluoromethylsulphonyl-11-(4β-butanoyloxyethyl-1-piperazinyl)dibenz[b,f][1,4]oxazepine is obtained in the form of a yellowish oil, which cannot be crystallized, by the process described in Example 1, except that 0.5 cc of butyric acid chloride are used as starting material, M.P. of oxalate salt form 209°–213°C. Thin layer chromatogram: see Table,

EXAMPLE 4

2-Trifluoromethylsulphonyl-11-(4β-decanoyloxyethyl-1-piperazinyl)dibenz[b,f][1,4]oxazepine [process (a)]

2-Trifluoromethylsulphonyl-11-(4β-decanoyloxyethyl-1-piperazinyl)dibenz[b,f][1,4]oxazepine is obtained in the form of a yellowish oil, which cannot be crystallized, by the process described in Example 1, except that 0.5 cc of capric acid chloride are used as starting material. M.P. of oxalate salt form 188°–190°C.

Maleate salt form 602 mg of the free base form of the title compound is mixed with 115 mg of maleic acid and taken up in acetone. The solution is strongly concentrated, taken up in ethyl acetate and concentrated again. Diethyl ether/petroleum ether is added, the solution is cooled to −20°C, and a half-amorphous precipitate filtered off. This precipitate is dissolved in acetone, the solution treated with active charcoal and filtered. The filtrate is strongly concentrated, taken up in ethyl acetate and concentrated again. After addition of diethyl ether/petroleum ether the maleate salt form of the title compound crystallizes out of the solution at −20°C. The maleate salt is filtered off and washed with diethyl ether/petroleum ether, M.P. 85°–90°C. Thin layer chromatogram: see Table.

EXAMPLE 5

2-Trifluoromethylsulphonyl-11-(4β-heptanoyloxyethyl-1-piperazinyl)dibenz[b,f][1,4]oxazepine [process (c)]

2.0 g of enanthic acid chloroethyl ester are added to a solution of 4.1 g of 2-trifluoromethylsulphonyl-11-(1-piperazinyl)-dibenz[b,f][1,4]oxazepine in 70 cc of toluene and the mixture is heated to 80°C for 4 hours. The mixture is subsequently concentrated by evaporation, water is added to the evaporation residue, this is rendered alkaline with concentrated caustic soda solution and extraction is effected with ether. The ethereal solution is washed with water and aqueous sodium chloride solution, is dried over sodium sulphate and concentrated by evaporation. The resulting yellow oil is dissolved in a mixture of ether/petroleum ether (1:4) and chromatographed on neutral aluminium oxide. After concentrating the eluates, 2-trifluoromethylsulphonyl-11-(4β-heptanoyloxyethyl-1-piperazinyl)-dibenz[b,f][1,4]oxazepine is obtained in the form of a light yellow oil which is identical with the product obtained in accordance with Example 1.

The 2-trifluoromethylsulphonyl-11-(1-piperazinyl)dibenz-[b,f][1,4]oxazepine, employed as starting material, may be produced in the manner described in Example 1 for the production of 2-trifluoromethyl-11-(4β-hydroxyethyl-1-piperazinyl)dibenz-[b,f][1,4]oxazepine, except that 20 cc of piperazine are employed in place of the N-(p-hydroxyethyl)piperazine.

EXAMPLE 6

2-Trifluoromethylsulphonyl-11-(4β-heptanoyloxyethyl-1-piperazinyl)dibenz[b,f][1,4]oxazepine [process (b)]

4.5 g of 2-trifluoromethylsulphonyl-10,11-dihydro-11-oxo-dibenz[b,f][1,4]oxazepine are heated under reflux for 4½ hours with 75 cc of phosphorus oxychloride and 1.5 cc of N,N-dimethyl aniline. The excess phosphorus oxychloride is removed by distillation in a vacuum, ice is added to the residue and extraction is effected with xylene. The xylene solution is washed with 2 N hydrochloric acid, water and aqueous sodium chloride solution, is dried over sodium sulphate, treated with active charcoal, filtered and somewhat concentrated. 3.6 g of 1-(β-heptanoyloxyethyl)piperazine are added to this solution of 2-trifluoromethylsulphonyl-11-chloro-dibenz[b,f][1,4]oxazepine and heating to the boil under reflux is effected for 5 hours. The reaction mixture is subsequently evaporated to dryness and the residue is dissolved in water. The aqueous solution is rendered alkaline with concentrated caustic soda solution while adding some ice and extraction is effected with ether. The ethereal phase is washed with water and subsequently extracted with 2 N hydrochloric acid. Ice is added to the hydrochloric acid solution and this is rendered alkaline with concentrated caustic soda solution. The separated oily product is extracted with ether, washed with water and aqueous sodium chloride solution and dried over sodium sulphate. After concentrating by evaporation, a light yellow oil is obtained, which is dissolved in a mixture of one part of ether and four parts of petroleum ether. The solution is filtered through neutral aluminium oxide and concentrated by evaporation. 2-Trifluoromethylsulphonyl-11-(4β-heptanoyloxyethyl-1-piperazinyl)dibenz[b,f][1,4]oxazepine is obtained in the form of a light yellow oil which is identical with the products obtained in accordance with Examples 1 and 5.

The 2-trifluoromethylsulphonyl-10,11-dihydro-11-oxo-dibenz[b,f][1,4]oxazepine, used as starting material in this Example, may be obtained as described in Example 1.

The 1-(β-heptanoyloxyethyl)piperazine, likewise used as starting material in this Example, is obtained as follows:

17 g of enanthic acid chloride are added dropwise while stirring to 22 g of 4-benzyl-piperazine-1-ethanol in 100 cc of chloroform. The mixture is subsequently heated in a steam bath for 15 minutes. The chloroform is removed in a vacuum, water is added to the residue, this is rendered alkaline with concentrated caustic soda solution and extracted thrice with ether. The ethereal extract is washed with water and aqueous sodium chloride solution, is dried over sodium sulphate, filtered through active charcoal and concentrated by evaporation. The residue is dissolved in petroleum ether and the solution is filtered through a small amount of aluminium oxide and concentrated by evaporation. 1-Benzyl-4-(β-heptanoyloxyethyl)-piperazine is obtained in the form of a colourless oil.

15 g of this product are dissolved in 50 cc of ethanol, the solution is rendered slightly acid with hydrochloric acid in ethanol and is concentrated. After the addition of ether, the dihydrochloride crystallizes, is filtered with suction and dried. 17.5 g of the resulting dihydrochloride are dissolved in 300 cc of ethanol and 16.2 g of the corresponding free base are added. 1 g of 5% palladium charcoal are added to the solution and hydrogenolysis is effected at room temperature and normal pressure for 6 hours. After filtering off the catalyst, the filtrate is concentrated by evaporation in a vacuum, the residue is dissolved in ethanol and a solution of hydrochloric acid in ethanol is added. After the addition of ether, 1-(β-heptanoyloxyethyl)piperazine dihydrochloride, having a M.P. of 172°–180°C, crystallizes. The base is liberated from the dihydrochloride by treatment with sodium ethanolate in ethanol.

EXAMPLE 7 [processes (b) and (c)]

In manner analogous to Example 5 or 6, and employing appropriate starting materials in approximately equivalent amounts, the following compounds may be obtained:

2-Trifluoromethylsulphonyl-11-(4β-tetradecanoyloxyethyl-1-piperazinyl)-dibenz[b,f][1,4]oxazepine, 2-trifluoromethylsulphonyl-11-(4β-butanoyloxyethyl-1-piperazinyl)-dibenz[b,f][1,4]oxazepine, and 2-trifluoromethylsulphonyl-11-(4β-decanoyloxyethyl-1piperazinyl)-dibenz[b,f][1,4]oxazepine.

EXAMPLE 8 [processes (a), (b) and (c)]

In a manner analogous to Example 1, 5 or 6 and employing appropriate starting materials in approximately equivalent amounts, the following compounds may be obtained:

2-trifluoromethylsulfonyl-11-[4-(isobutyryloxyethyl)-1-piperazinyl]dibenz[b,f][1,4]oxazepine, M.P. 213°-216°C (oxalate salt form);

2-trifluoromethylsulfonyl-11-[4-(n-pentanoyloxyethyl)-1-piperazinyl]dibenz[b,f][1,4]oxazepine, M.P. 209°-213°C (oxalate salt form);

2-trifluoromethylsulfonyl-11-[4-(isovaleryloxyethyl)-1-piperazinyl]dibenz[b,f][1,4]oxazepine, M.P. 206°-210°C (oxalate salt form);

2-trifluoromethylsulfonyl-11-[4-(2-methylbutyryloxyethyl)-1-piperazinyl]-dibenz[b,f][1,4]oxazepine, M.P. 205°-209°C (oxalate salt form);

2-trifluoromethylsulfonyl-11-[4-(pivaloyloxyethyl)-1-piperazinyl]dibenz[b,f][1,4]oxazepine, M.P. 87°-92°C (free base form);

2-trifluoromethylsulfonyl-11-[4-(n-hexanoyloxyethyl)-1-piperazinyl]dibenz[b,f][1,4]oxazepine, M.P. 205°-209°C (oxalate salt form); and 2-trifluoromethylsulfonyl-11-[4-(4-methylpentanoyloxyethyl)-1-piperazinyl]-dibenz[b,f][1,4]oxazepine, M.P. 207°-212°C (oxalate salt form).

EXAMPLE 9

2-Trifluoromethylsulfonyl-11(4β-oleoyloxyethyl-1-piperazinyl)dibenz-[b,f][1,4]oxazepine [Process variant (a)]

1.0 g of trifluoromethylsulfonyl-11-(4β-hydroxyethyl-1-piperazinyl)dibenz[b,f][1,4]oxazepine is dissolved in 20 ml of absolute pyridine, 1.5 g oleic acid chloride are added to the solution and the reaction mixture is allowed to stand overnight. The reaction mixture is concentrated by evaporation in a vacuum and water is added to the residue. The mixture is rendered alkaline with caustic soda solution and is subsequently extracted with ether. The ether phase is repeatedly washed with water and dried with sodium sulfate, clarified with active charcoal and concentrated by evaporation. The title compound in free base form is obtained as a yellowish oil which cannot be crystalized.

Thin layer chromatogram: see table.

In a manner analogous to that described in Example 9, the following compounds may be prepared:

2-trifluoromethylsulphonyl-11-[4-(2-methylpropenoyloxyethyl)-1-piperazinyl]-dibenz[b,f][1,4]oxazepine;

2-trifluoromethylsulphonyl-11-[4-(4-methylpent-3-enoyloxyethyl)-1-piperazinyl]dibenz[b,f][1,4]oxazepine; and 2-trifluoromethylsulphonyl-11-[4-(3-methylbut-2-enoyloxyethyl)-1-piperazinyl]dibenz[b,f][1,4]oxazepine.

Table of thin layer chromatograms

| Example | | Eluting agent (layer: silica gel SL 254 Antec) | | Indicator | Rf value |
|---|---|---|---|---|---|
| 1 | a) | chloroform/methanol/diethylamine | (8:1:1) | Dragendorff's reagent | 0.84 |
| | b) | chloroform/methanol/glacial acetic acid | (8:1:1) | do. | 0.79 |
| | c) | ethyl acetate/glacial acetic acid/water | (5:2:2) | do. | 0.93 |
| 2 | a) | chloroform/cyclohexane/diethylamine | (5:4:1) | Dragendorff's reagent | 0.76 |
| | b) | chloroform/methanol/glacial acetic acid | (8:1:1) | do. | 0.91 |
| 3 | a) | chloroform/cyclohexane/diethylamine | (5:4:1) | Dragendorff's reagent | 0.63 |
| | b) | chloroform/methanol/glacial acetic acid | (8:1:1) | do. | 0.68 |
| | c) | ethyl acetate/glacial acetic acid/water | (5:2:2) | do. | 0.87 |
| 4 | a) | chloroform/cyclohexane/diethylamine | (5:4:1) | Dragendorff's reagent | 0.64 |
| | b) | chloroform/methanol/glacial acetic acid | (8:1:1) | do. | 0.82 |
| 9 | | chloroform/cyclohexane/diethylamine | (5:4:1) | Dragendorff's reagent | 0.88 |

What is claimed is:

1. A compound of the formula:

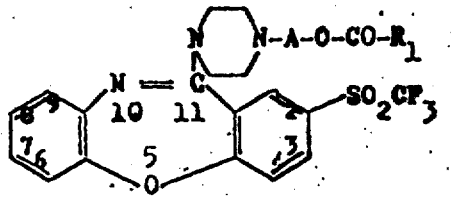

wherein

A is alkylene of 1 to 3 carbon atoms, and $R_1$ is alkyl of 3 to 18 carbon atoms or alkenyl of 3 to 18 carbon atoms, or a pharmaceutically acceptable acid addition salt thereof.

2. A compound of claim 1, wherein A is ethylene, and $R_1$ is unbranched alkyl of 3 to 13 carbon atoms.

3. The compound of claim 2, which is 2-trifluoromethylsulfonyl-11-(4β-heptanoyloxyethyl-1-piperazinyl)dibenz[b,f][1,4]oxazepine.

4. The compound of claim 2, which is 2-trifluoromethylsulfonyl-11-(4β-tetradecanoyloxyethyl-1-piperazinyl)dibenz[b,f][1,4]oxazepine.

5. The compound of claim 2, which is 2-trifluoromethylsulfonyl-11-(4β-butanoyloxyethyl-1-piperazinyl)dibenz[b,f][1,4]oxazepine.

6. The compound of claim 2, which is 2-trifluoromethylsulfonyl-11-(4β-decanoyloxyethyl-1-piperazinyl)dibenz[b,f][1,4]oxazepine.

7. The compound of claim 2, which is 2-trifluoromethylsulfonyl-11-[4-(n-pentanoyloxyethyl)-1-piperazinyl]dibenz[b,f][1,4]oxazepine.

8. The compound of claim 3, which is 2-trifluoromethylsulfonyl-11-[4-(n-hexanoyloxyethyl)-1-piperazinyl]dibenz[b,f][1,4]oxazepine.

9. The compound of claim 1, which is 2-trifluoromethylsulfonyl-11-[4-(isobutyryloxyethyl)-1-piperazinyl]dibenz[b,f][1,4]oxazepine.

10. The compound of claim 1, which is 2-trifluoromethylsulfonyl-11-[4-(isovaleryloxyethyl)-1-piperazinyl]dibenz[b,f][1,4]oxazepine.

11. The compound of claim 1, which is 2-trifluoromethylsulfonyl-11-[4-(2-methylbutyryloxyethyl)-1-piperazinyl]dibenz[b,f][1,4]oxazepine.

12. The compound of claim 1, which is 2-trifluoromethylsulfonyl-11-[4-(pivaloyloxyethyl)-1-piperazinyl]dibenz[b,f][1,4]oxazepine.

13. The compound of claim 1, which is 2-trifluoromethylsulfonyl-11-[4-(4-methylpentanoyloxyethyl)-1-piperazinyl]-dibenz[b,f][1,4]oxazepine.

14. The compound of claim 1, which is 2-trifluoromethylsulfonyl-11-(4β-oleoyloxyethyl-1-piperazinyl)dibenz[b,f][1,4]oxazepine.

* * * * *